(12) United States Patent
Cawthon

(10) Patent No.: US 6,427,259 B1
(45) Date of Patent: Aug. 6, 2002

(54) OUTDOOR PORTABLE SINK WITH PLUMBING CONNECTION

(75) Inventor: Gregory Stuart Cawthon, Mobile, AL (US)

(73) Assignee: Cawthon Enterprises, Inc., Mobile, AL (US)

( * ) Notice: Subject to any disclaimer, the term of this patent is extended or adjusted under 35 U.S.C. 154(b) by 0 days.

(21) Appl. No.: 09/645,927

(22) Filed: Aug. 25, 2000

Related U.S. Application Data

(60) Provisional application No. 60/163,659, filed on Nov. 5, 1999.

(51) Int. Cl.$^7$ .............................. E03C 1/182; E03C 1/14; E03C 1/18; A47K 1/04
(52) U.S. Cl. ...................... 4/650; 4/619; 4/643; 4/644; 4/646; 4/652; 4/654; 4/656
(58) Field of Search ............................. 4/619, 625, 626, 4/628, 630, 643, 644, 646, 650, 652, 653, 654, 656; 108/129, 130, 131, 133; 248/188.6, 150, 167, 171, 439

(56) References Cited

U.S. PATENT DOCUMENTS

| | | |
|---|---|---|
| 1,420,511 A | 6/1922 | Armstrong |
| 2,594,938 A | 4/1952 | Leavitt |
| 3,041,957 A | 7/1962 | Liptay |
| 3,566,856 A | 3/1971 | Linstead |
| 3,594,830 A | 7/1971 | Clifton |
| 3,748,437 A | 7/1973 | Keeshin et al. |
| 3,915,529 A | 10/1975 | Bernier |
| 4,213,309 A | 7/1980 | Pifer |
| 4,341,164 A | 7/1982 | Johnson |
| 4,440,185 A | 4/1984 | Wiltse |
| 4,720,879 A | 1/1988 | Rabban |
| 4,747,169 A | 5/1988 | Valbuena |
| 4,766,621 A | 8/1988 | Rasor |
| 4,934,280 A | 6/1990 | Bae |
| 5,301,376 A | 4/1994 | Herbert |
| 5,313,676 A | 5/1994 | Wright |
| 5,502,848 A | 4/1996 | Cowan |
| 5,566,404 A | 10/1996 | Laughton |
| 5,683,157 A | 11/1997 | Peterson et al. |
| 5,813,063 A | 9/1998 | Watkins et al. |
| 5,881,404 A | 3/1999 | Knight |
| 5,926,866 A | 7/1999 | Chao |

FOREIGN PATENT DOCUMENTS

| | | |
|---|---|---|
| JP | 4-92034 | 3/1992 |
| JP | 5-9962 | 1/1993 |

*Primary Examiner*—Gregory L. Huson
*Assistant Examiner*—Tuan Nguyen
(74) *Attorney, Agent, or Firm*—Dickinson Wright PLLC

(57) ABSTRACT

The invention is a portable sink with a lid that is capable of being connected to an existing water supply, such as an outdoor hose or faucet, such that running water can be provided inside the sink in an outdoor environment. The sink preferably has features that make it easy to use in any outdoor environment, such as folding legs, an adjustable spigot, a spray nozzle, a storage drawer, a shelf, a large drain, a funnel, a strainer for the drain, cutting boards, baskets, etc. The lid also enables the sink to be used as a container for storing items during travel. In this respect, the sink can be made of an insulating material so that it can double as an ice chest when desired. A pressurized water tank can be provided which is preferably sized to fit inside the sink and adapted to supply water where no other water supply is available.

23 Claims, 13 Drawing Sheets

OUTDOOR PORTABLE SINK WITH PLUMBING CONNECTION

RELATED APPLICATION

This application claims the benefit of the filing date of U.S. Provisional Application Serial No. 60/163,659, filed Nov. 5, 1999.

FIELD OF THE INVENTION

The present invention relates to the field of sinks, and in particular, to a portable sink that can be used outdoors for activities like camping, fishing, hunting, and the like.

BACKGROUND OF THE INVENTION

Many outdoor activities, such as hunting, fishing, camping, etc., involve clean-up requirements for which an outdoor sink would be desirable. Although many camp grounds have running water via an outdoor faucet, most outdoor areas do not have outdoor sinks where clean-up tasks, such as cleaning fish and game, washing pots and pans, etc., can be done. Moreover, although most homes have outdoor water faucets (i.e., for attaching to garden hoses), they do not have outdoor sinks for clean-up tasks such as painting projects, washing dogs, potting plants, etc.

Some attempts have been made in the past to provide portable sinks that can be used outdoors. For example, in Leavitt, U.S. Pat. No. 2,594,938, a portable camping sink that includes a tank and tub hinged together, that can be locked together during transportation, and placed in an open position during use, is disclosed. The tank contains water used to provide the tub (sink) with its own water supply. Also, in Valbuena, U.S. Pat. No. 4,747,169, a portable camping sink with a pressurized water supply is disclosed. The sink has a main case and an open top with a hinged cover. Valbuena also provides its own water supply so that it can be used much like a sink at home. Another attempt relates to a portable kitchen unit that includes a detachable sink, shown in Peterson et al., U.S. Pat. No. 5,683,157. This sink is said to have many uses, including as a lid, lock, wash basin, stand, table, storage bin, etc. This sink, however, does not have its own water supply, and has no means of providing water; it simply shows a container that serves as a sink basin.

What is needed, therefore, is a portable sink that can not only be easily transported and set up in an outdoor environment, but that also has many of the features that are desirable, including legs that unfold to support the sink, a connection to an existing water supply, a spray nozzle for spraying water, an adjustable spigot, storage for various utensils and appliances, etc.

SUMMARY OF THE INVENTION

The present invention relates to a portable sink with a lid that is capable of being connected to an existing water supply, such as an outdoor hose or faucet, such that running water can be provided inside the sink in an outdoor environment. The preferred embodiment of the present invention preferably has many features, including legs that unfold to support the sink in an elevated position, an adjustable spigot that can be lowered and raised depending on whether the lid is opened or closed, a handle for the spigot to control the flow of water into the sink, a spray nozzle for providing a controlled spray of water which can be useful for cleaning purposes, a storage drawer for storing various utensils and appliances, a shelf extending from the lid which is adapted to be level when the lid is opened, a large drain for allowing water and debris in the sink to be easily drained out, funnels that can be extended from the drain to direct water in the appropriate direction, strainers for straining debris flowing out of the sink, supports within the sink capable of allowing cutting boards and baskets to be supported thereon, etc. The lid enables the sink to be used as a container for storing items during travel. The sink can also be made of an insulating material so that it can double as an ice chest when desired. A pressurized water tank can be provided which is preferably sized to fit inside the sink and adapted to supply water where no other water supply exists.

DETAILED DESCRIPTION OF THE INVENTION

Figure 1:
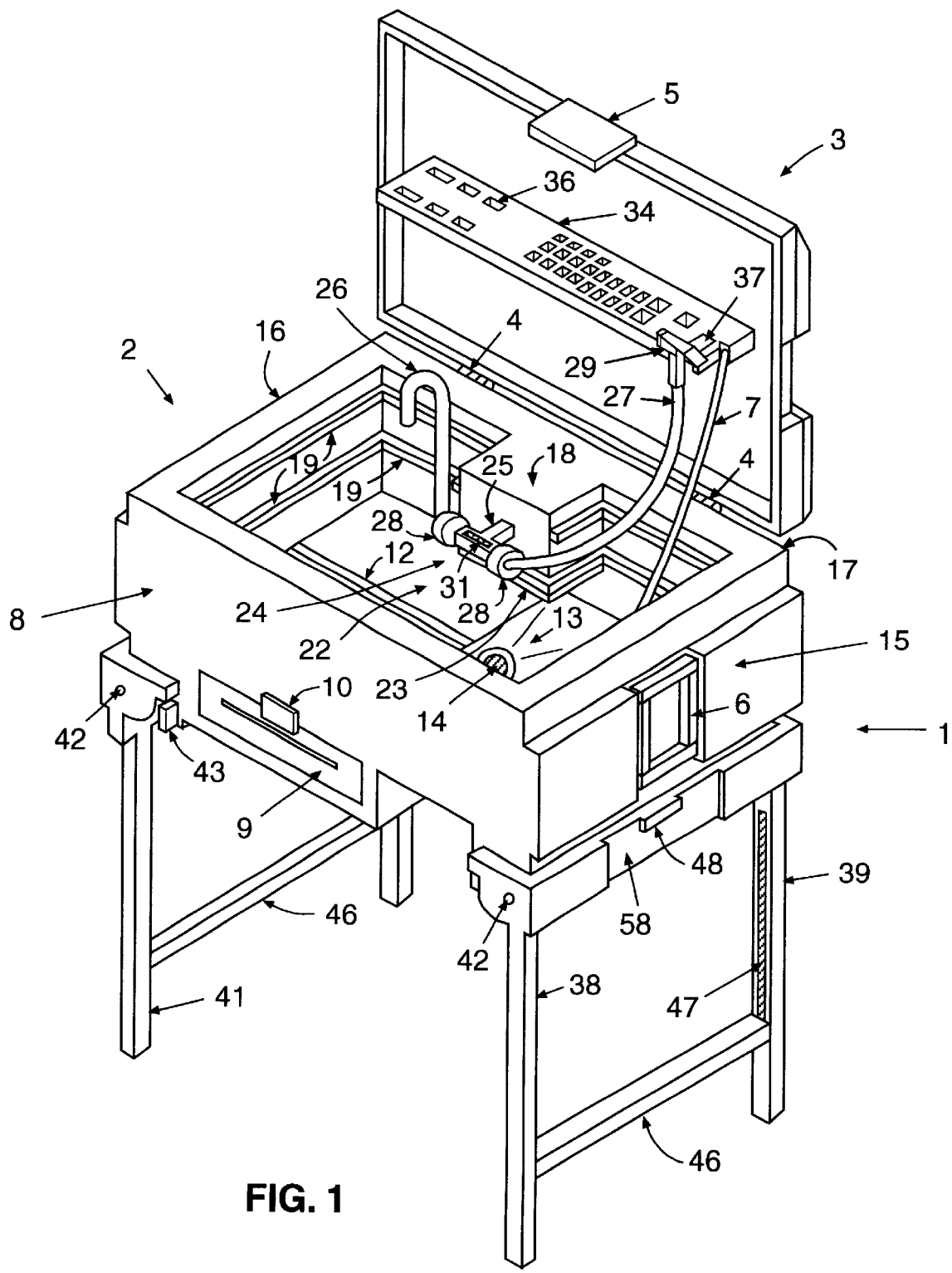
FIG. 1 is a perspective view of the present invention.

As shown in FIG. 1, the present invention relates to a portable sink 1 having a sink portion 2 and lid 3 connected by hinges 4 such that lid 3 can be opened and closed. When lid 4 is closed, a latch 5 is provided to secure lid 3 on sink portion 2. When lid 3 is opened, a stop 7 is provided which limits the opening of the lid. The stop 7 can be a cord or chain, as is known in the art, which is hooked at one end to the sink portion 2 and the other end to the lid 3 as shown in FIG. 1.

Figure 6:
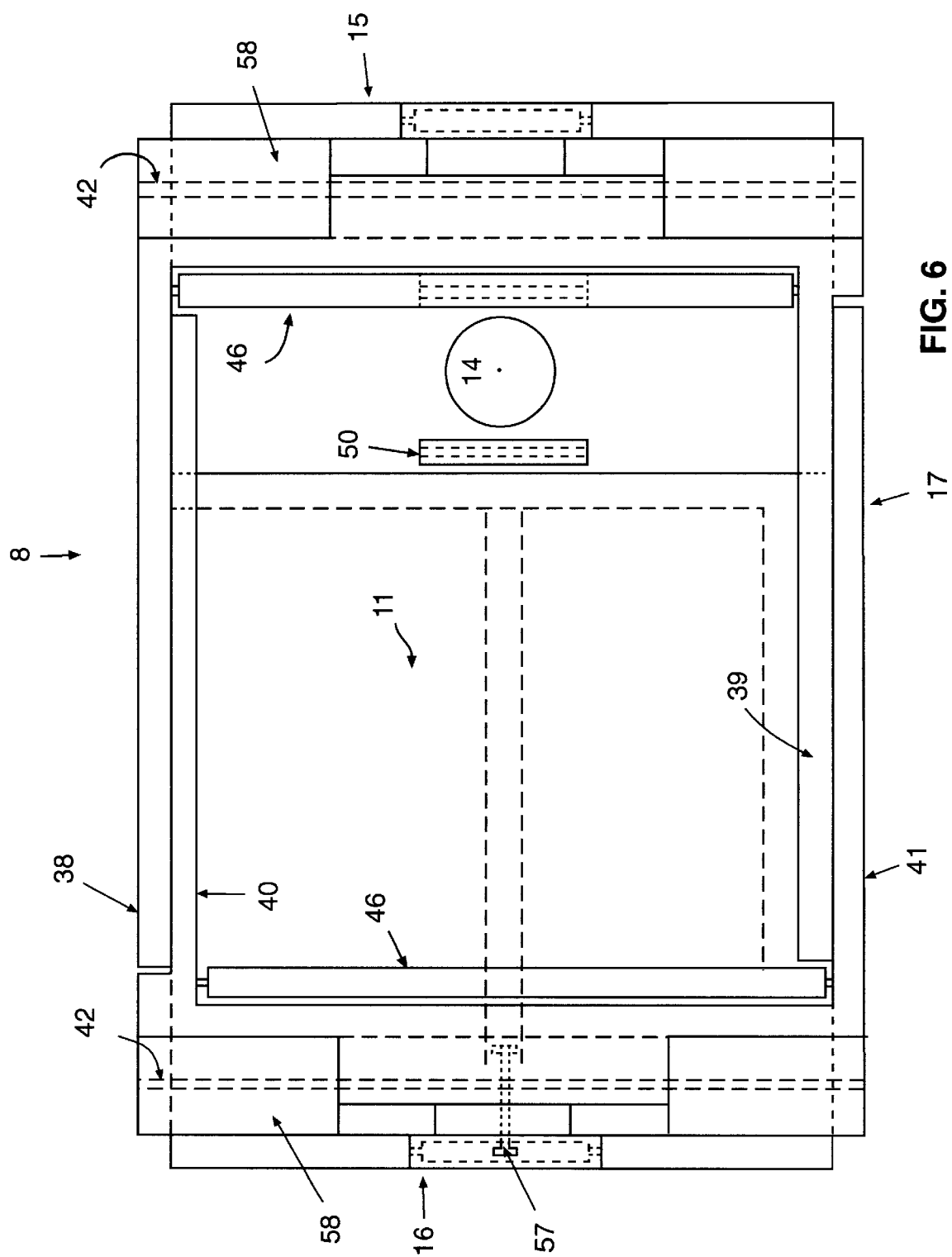
FIG. 6 is a bottom view of the present invention with legs folded.
Figure 7:
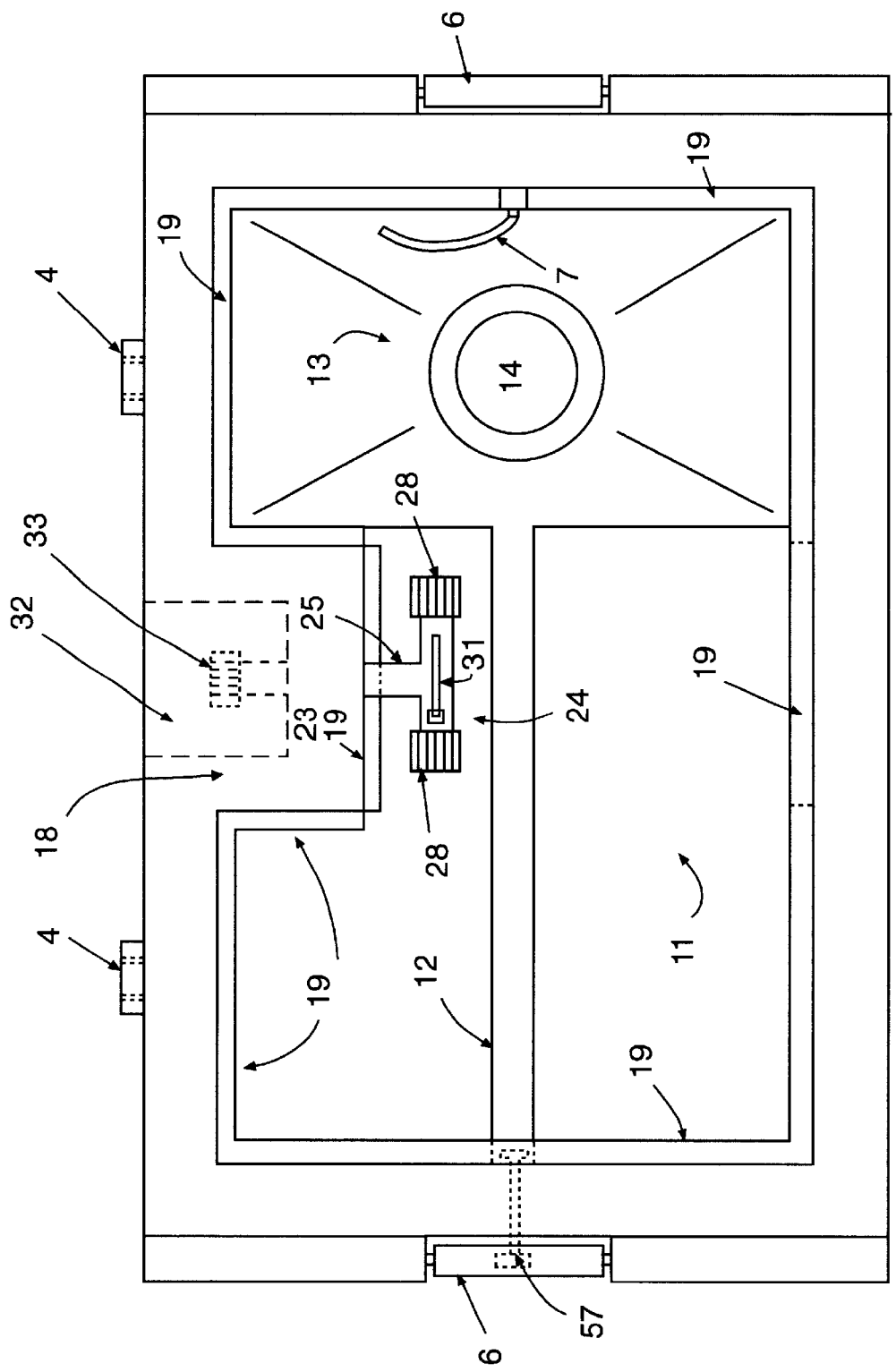
FIG. 7 is a top view of the present invention without lid.

Sink portion 2 is preferably comprised of a body having sidewalls 8, 15, 16, 17 and a floor 11 as shown in FIGS. 6–7. It preferably has handles 6 on either side which can be used to carry the sink 1. The handles 6 can be any conventional type, including, for example, a loop style handle connected at both ends by a hinge, which can be swung up from the sink portion 2, as is known in the art.

Figure 2:
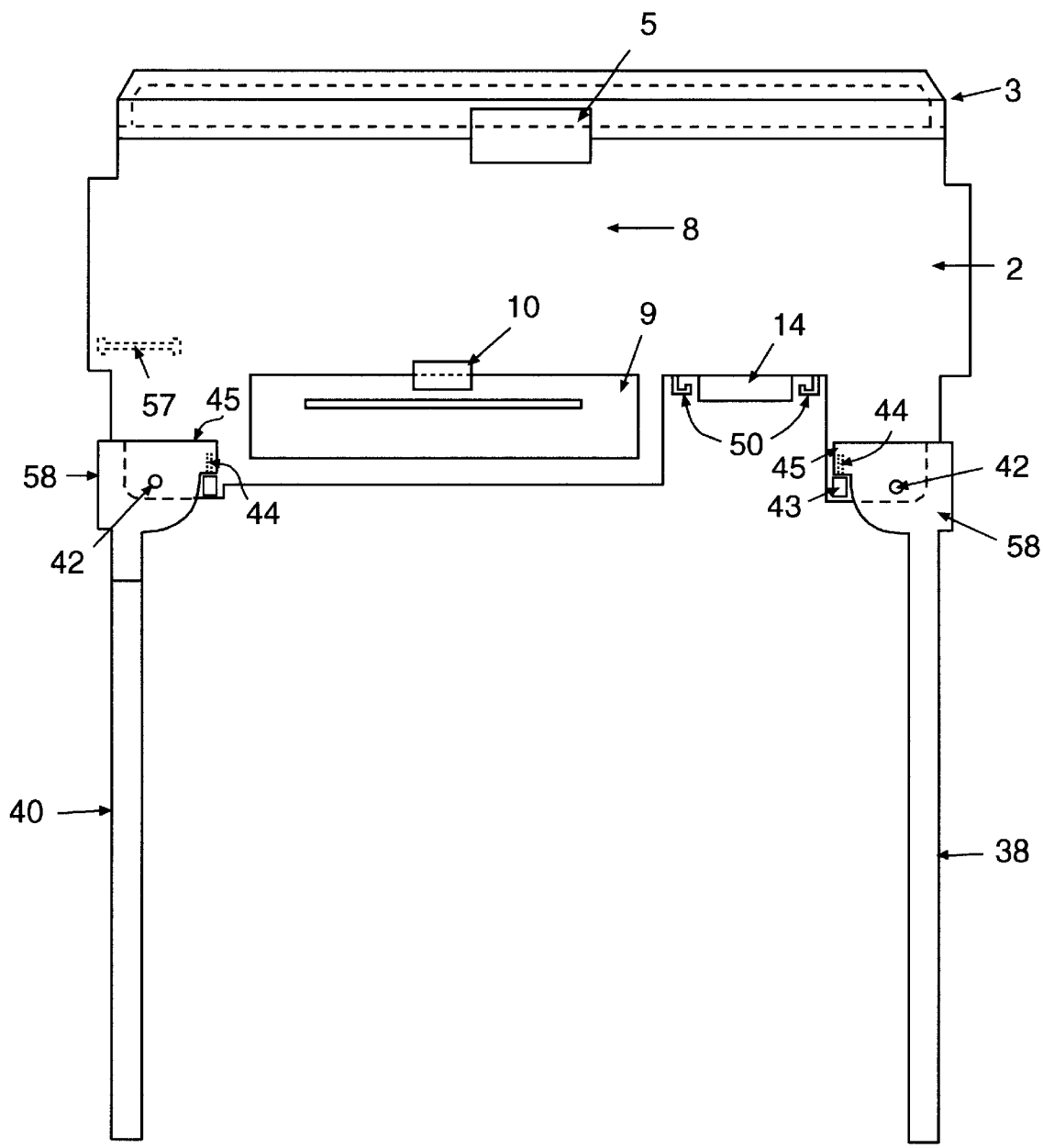
FIG. 2 is a front view of the present invention.

The sink portion 2 is preferably substantially in the shape of a rectangular box as shown in FIG. 1. Frontwall 8 is preferably provided with an opening with a drawer 9 inside having a latch 10, as shown in FIGS. 1–2, to secure the drawer in a closed position, i.e., such as during transportation. Drawer 9 is preferably built into an opening formed on frontwall 8 which extends into a cavity formed in floor 11 of sink portion 2. Drawer 9 can be made to slide in and out of sink portion 2 in any conventional manner. Drawer 9 also preferably has means for opening the drawer such as a handle or groove.

The top surface of floor 11 preferably has a groove 12 or channel extending along the center on one side thereof, as shown in FIG. 7. Groove 12 is preferably sloped and helps guide water on top of floor 11 into drain area 13. Drain area 13 is also preferably sloped downward toward and around a drain 14. Preferably, drain 14 is located at the lowest point of the top surface of floor 11 to allow water to drain out of sink portion 2 by gravity alone. Drain 14 is preferably large enough to allow debris to pass, such as fish and game parts, etc.

Figure 5:
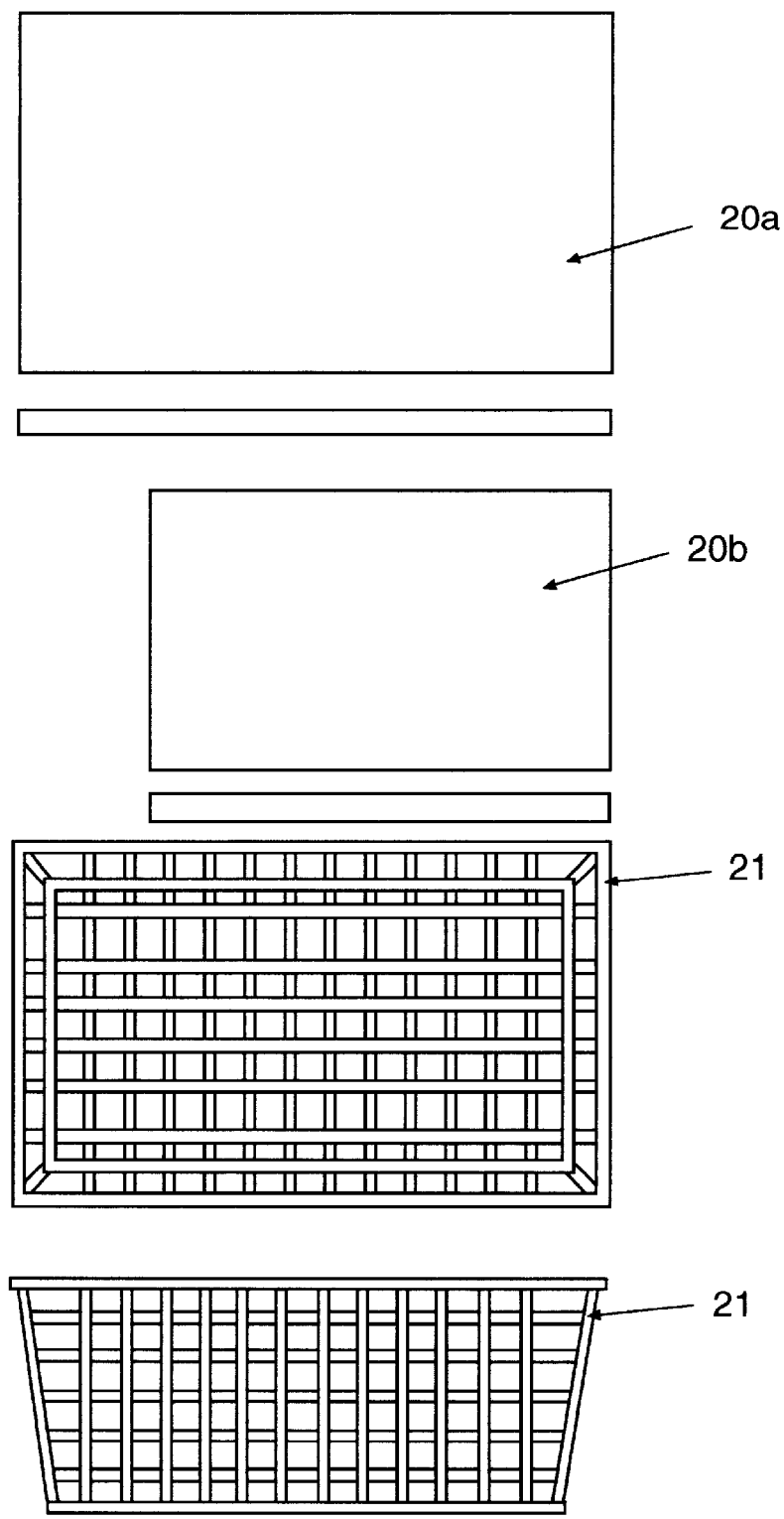
FIG. 5 shows cutting boards and baskets that can be used in the present invention.
Figure 8:
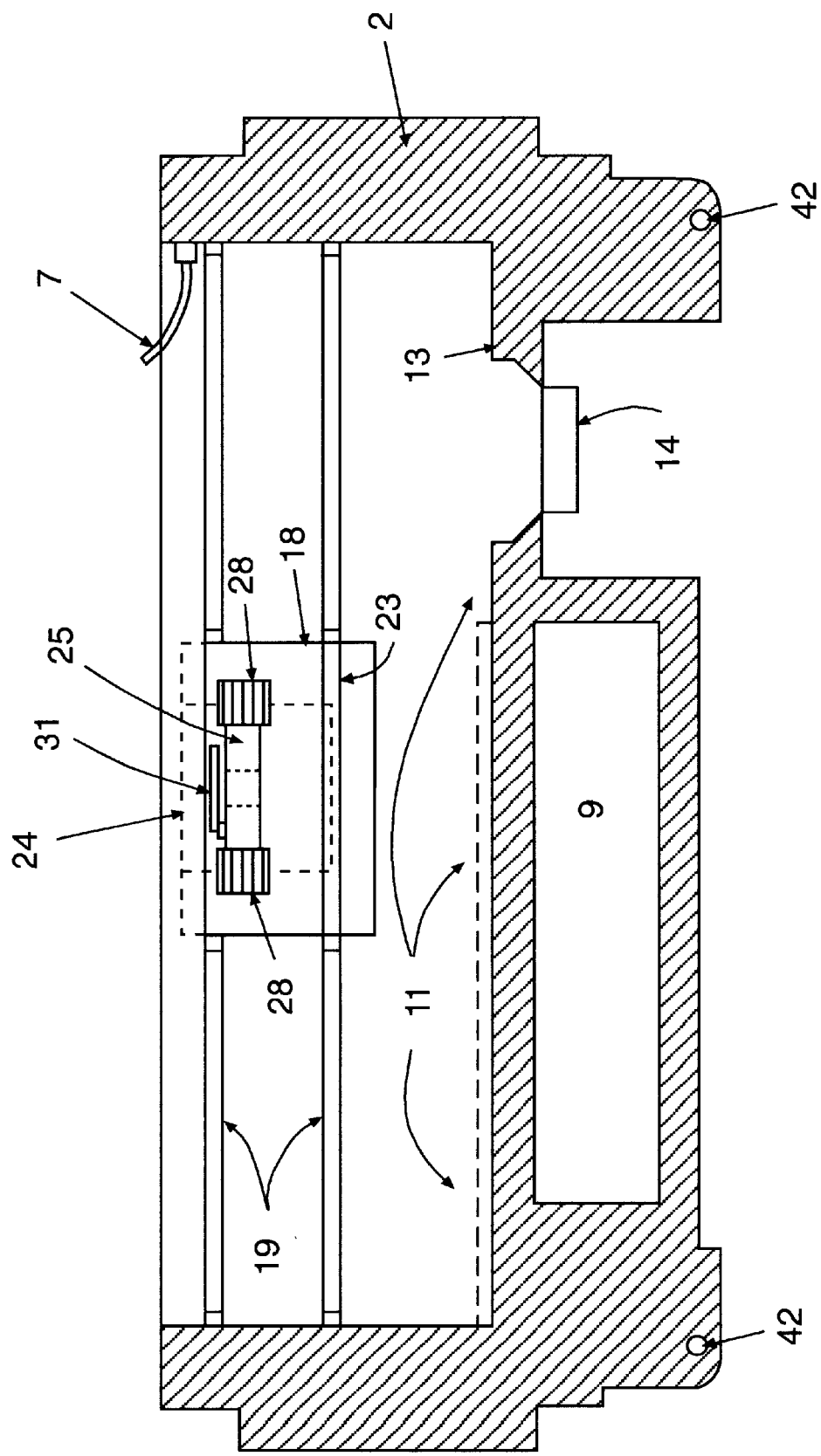
FIG. 8 is a section view of the present invention.

Walls 8, 15, 16 and 17 preferably form a substantially rectangular shaped box, although not necessarily so, with a center section 18 extending in from the center of wall 17, as shown in FIG. 1. Along the internal surface of walls 8, 15, 16 and 17, as well as portions of center section 18, there are preferably one or more ledges 19 to support auxiliary items, such as cutting boards 20, or basket 21, as shown in FIG. 5. Two different size cutting boards, 20a and 20b, can be provided, i.e., large cutting board 20a is adapted to fit in sink portion 2 on either side of center section 18, and small cutting board 20b is adapted to fit within a central space 22, shown in FIG. 1, in front of center section 18, spanning between wall 8 and section 18. There are preferably two ledges 19 on sink portion 2, one at a relatively low level, and one at a relatively high level, of walls 8, 15, 16, 17. The center section 18 preferably has only one lower level ledge 23, as shown in FIG. 8, to allow room for faucet assembly 24 which extends from the front of center section 18.

Figure 11:
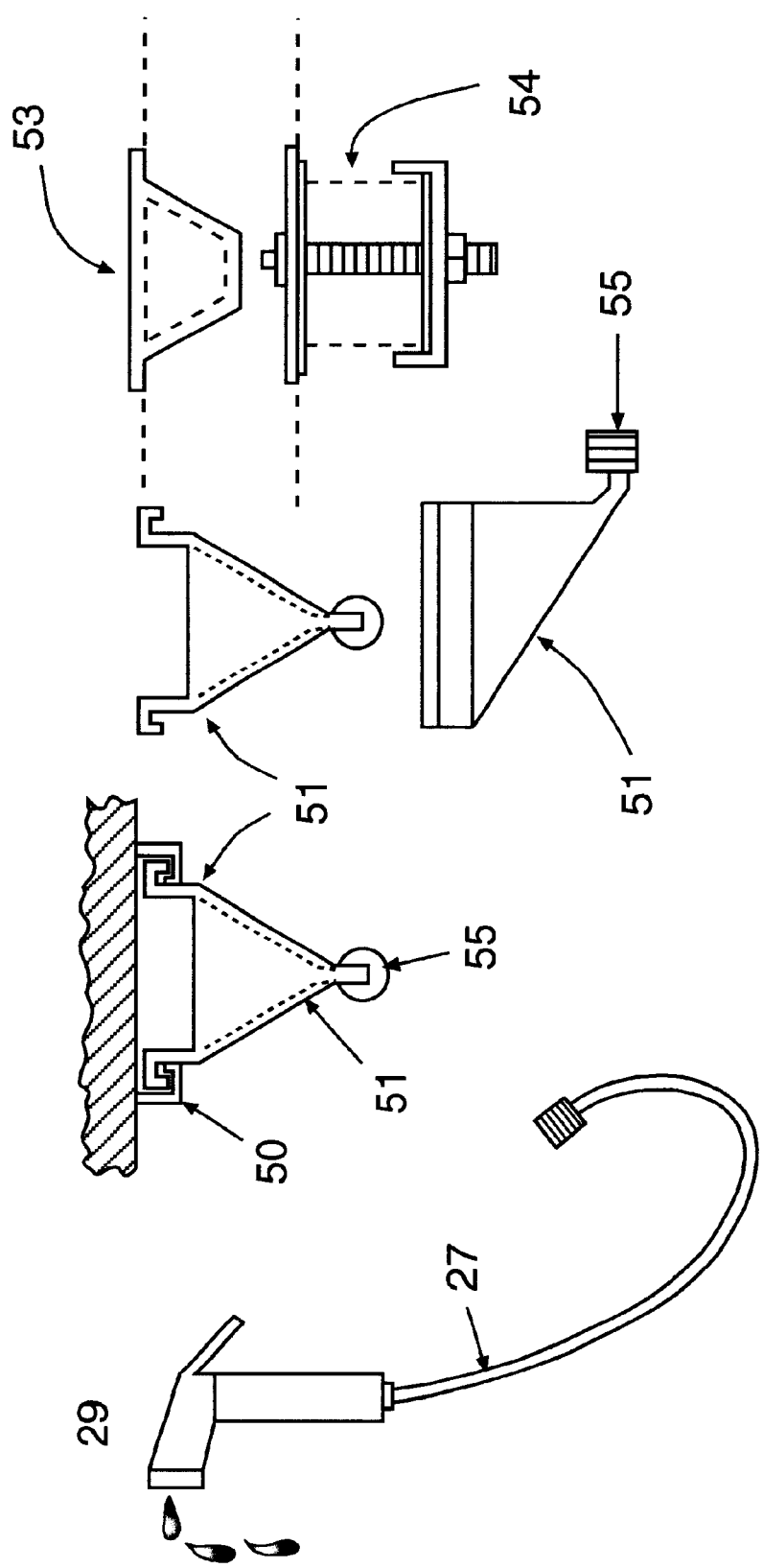
FIG. 11 shows various spray and funnel designs and plug.

Faucet assembly 24, shown in FIG. 7, comprises a T-section 25 extending from section 18 which is adapted to engage spigot 26, on one end, and spray hose 27, on the other. Both spigot 26 and hose 27 preferably have threaded ends such that they can be attached and detached from T-section 25 using threaded nuts 28, shown in FIGS. 7–8. A threaded end of spigot 26, for example, can be adapted to engage threaded nut 28 on one end of T-section 25, wherein by loosening threaded nut 28 on spigot 26, the spigot can be rotated up or down. When lid 3 is open, spigot 26 can be extended up vertically, but spigot 26 can also be rotated down to allow the lid 3 to be closed when desired. In this respect, threaded nut 28 can preferably be used to hold spigot 26 at various angles if desired. Spray hose 27 has a spray nozzle 29 with a handle attached thereto as shown in FIG. 11. Spray nozzle 29 is like any conventional spray nozzle with a handle and valve which can be operated by the handle.

Figure 9:
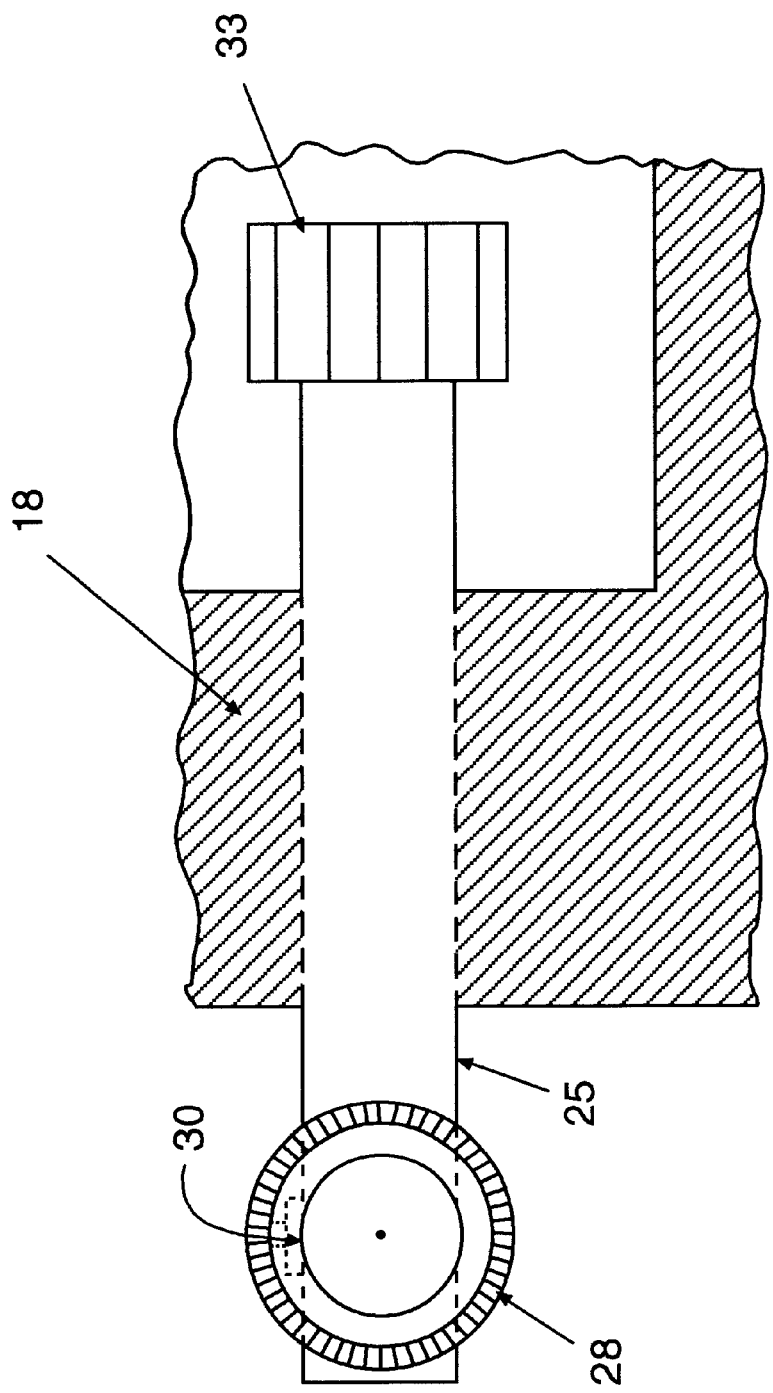
FIG. 9 is a section view of the t-section.

Within T-section 25 is valve 30, as shown in FIG. 9, which can be any conventional type. The valve 30 is preferably operatively associated with handle 31, shown in FIG. 7, on T-section 25, to control the supply of running water through spigot 26. Handle 31 operates valve 30 so that water under pressure can be released by turning handle 31 in the conventional way. A valve is not required on the opposite side of T-section 25 since spray nozzle 29 preferably has its own valve.

Figure 3:
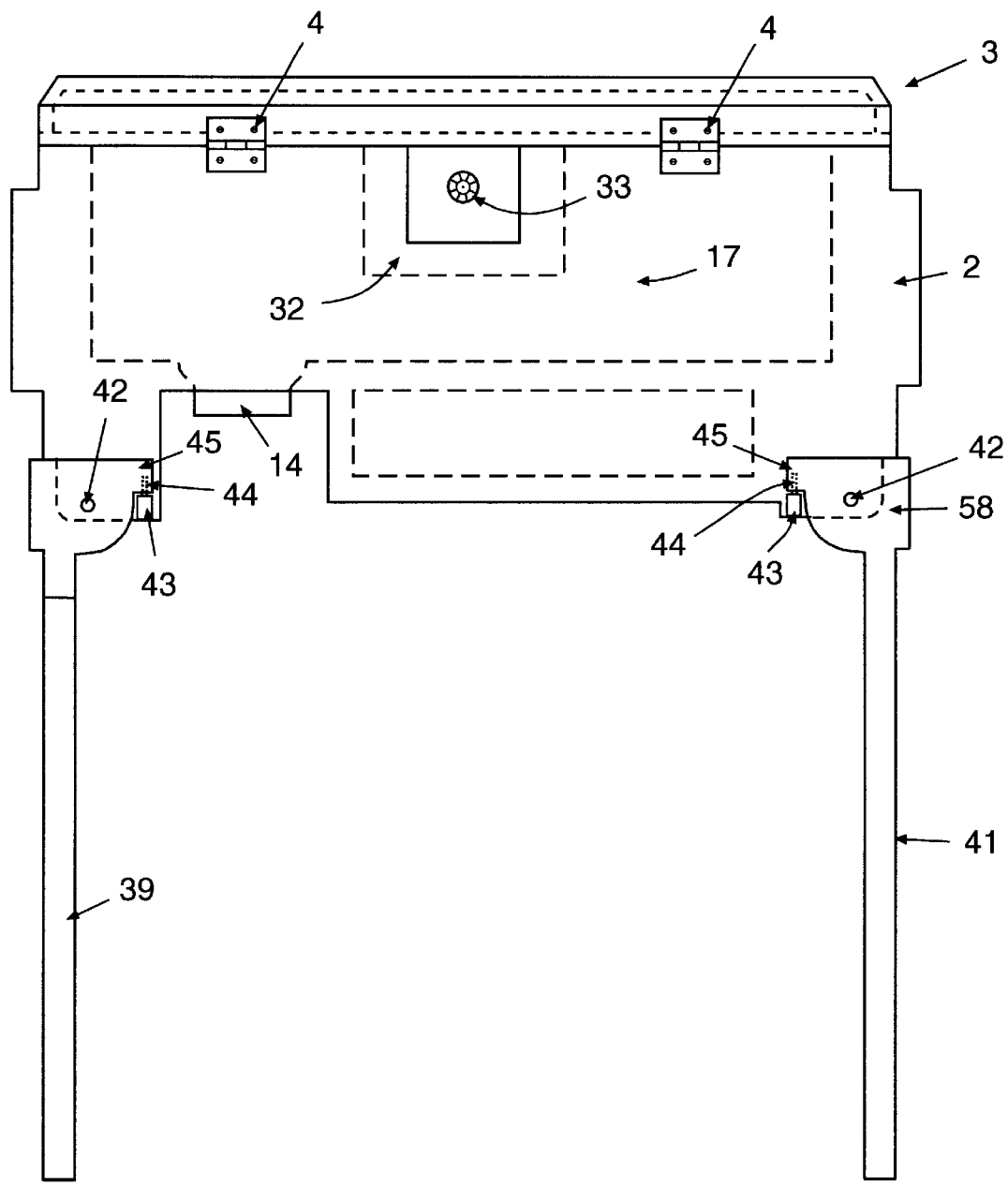
FIG. 3 is rear view of the present invention.
Figure 4:
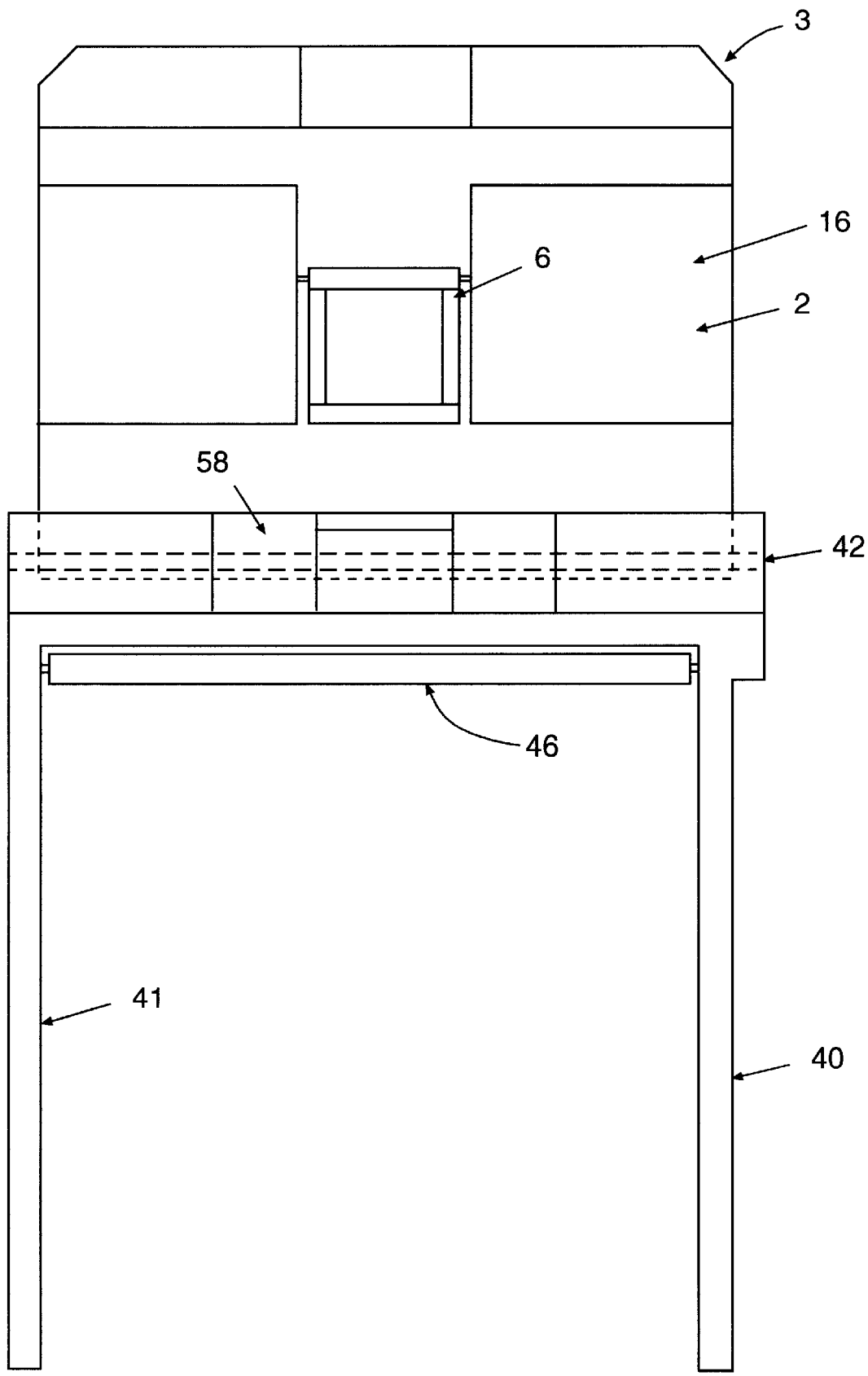
FIG. 4 is a side view of the present invention.

On the backside of section 18 and wall 17 is an indentation area 32 with a hose connection 33, as shown in FIGS. 3 and 7. Indentation 32 keeps connection 33 from protruding out the back wall 17, which makes storing sink 1 easy. The hose connection 33 preferably comprises a pipe structure having an opening that extends through section 18 to communicate with T-section 25, as shown in FIG. 9. Hose connection 33 is adapted to connect sink 1 to an existing water supply. It preferably comprises a nut with an internal thread into which the threaded end of a standard size hose (not shown) can be attached. In this respect, connection 33 can be any conventional type connection which enables an externally threaded hose or pipe to be inserted and connected thereto. An adapter (not shown) to enable connection 33 to be used in connection with an internally threaded connector or different size pipe can also be provided.

Figure 10:
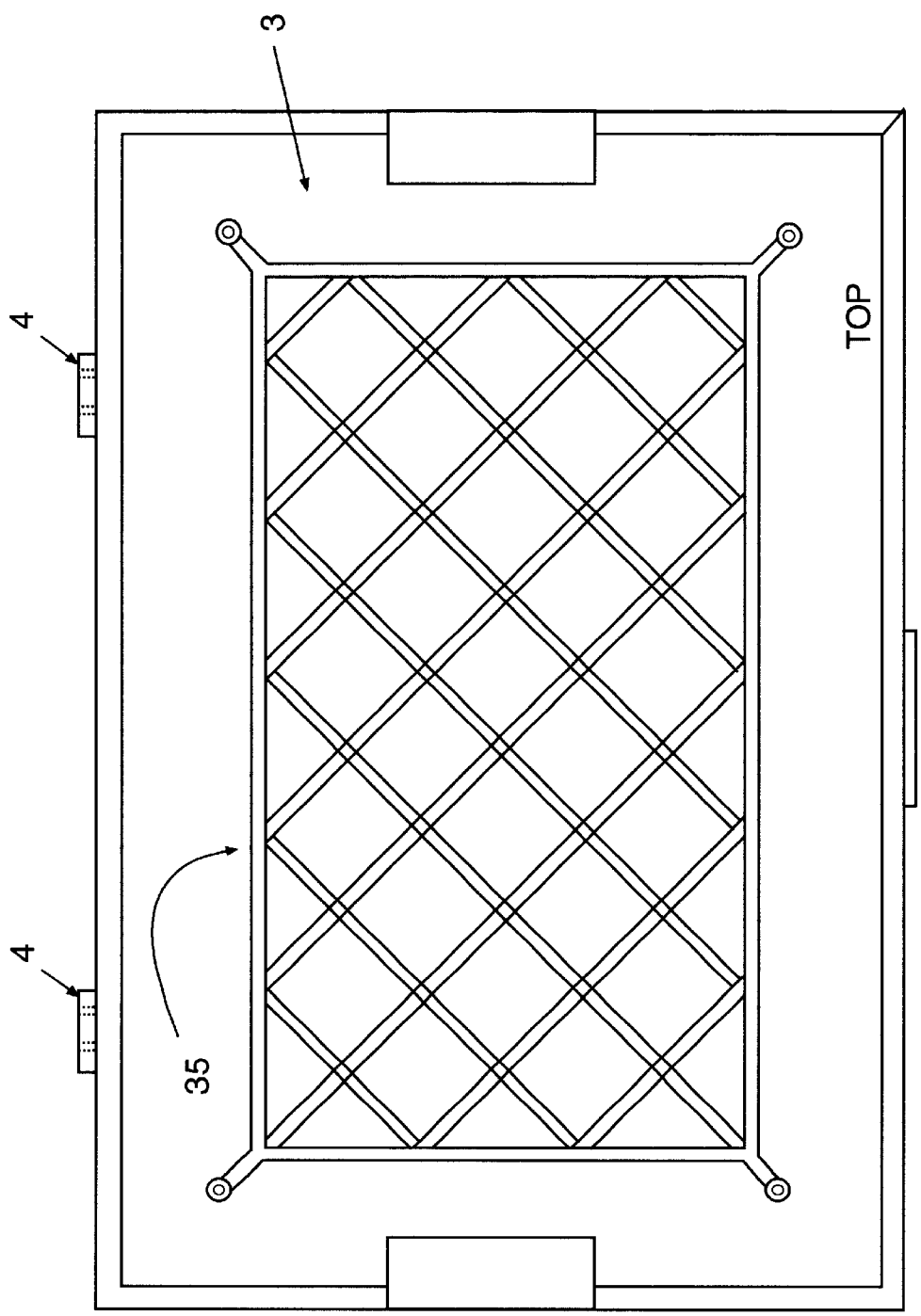
FIG. 10 a front view of the mesh embodiment of the lid.

The inside of lid 3 preferably has a shelf 34, as shown in FIG. 1, or basket (not shown), thereon. Shelf 34 is preferably secured to the inside of lid 3 such that when lid 3 is upright, shelf 34 is substantially horizontal. Openings 36 of various sizes are preferably provided on shelf 34 for holding utensils such as knives, toothbrushes, spoons, forks, etc. A hook 37 is also preferably provided for hanging spray nozzle 29. Stop cord 7 can also be secured to shelf 34 or directly to lid 3. An elastic mesh net 35, such as an elastic cargo net, as shown in FIG. 10, can also be provided on the outside of lid 3. Mesh 35 is preferably secured to lid 3 at its four corners and enables items such as towels, blankets, etc. to be stored therein.

Below sink body portion 2 are legs 38, 39, 40 and 41. Each leg extends from a hinge 42 which allows the legs to swing from a tucked position under the sink portion 2 to an extended upright position as shown in FIGS. 1 and 2. When extended, legs 38, 39, 40 and 41 can be locked in their upright position by a locking mechanism 43, comprising a pin 44 that mates with a spring tension latch 45, as shown in FIG. 2. Tension on latch 45 is preferably tight enough to support legs 38, 39, 40 and 41 in their upright positions, while loose enough to allow the legs to be easily pushed into their tucked position, as shown in FIG. 6. Enough friction is preferably provided by hinge 42 to hold legs 38, 39, 40, 41 in their tucked position.

Legs 38, 39, 40 and 41 are preferably offset (from one side to the other), as shown in FIG. 6, i.e., legs 38 and 39, which extend from the right side, are offset toward the front of the sink 2, and legs 40 and 41, which extend from the left side, are offset toward the back of the sink 2, such that all four legs can be swung up into the tucked position without overlapping each other (to be more compact). The legs can also be offset in the opposite direction. Crossbars 46 preferably extend between legs 38 and 39, and 40 and 41, respectively, and can preferably slide up and down along grooves 47 extending along a portion of the length of the legs as shown in FIG. 1. When moved up, the crossbars 46 are moved out of the way so that they advantageously allow the legs to fold up into the tucked position. When the legs are swung down to their upright positions, the crossbars 46 can be slid down to help support and provide rigidity to the legs. Legs 38, 39, on one side of sink portion 2 are preferably connected at the top by lateral member 58, and legs 40, 41, on the other side of sink portion 2, are likewise connected at the top by another lateral member 58 on the other side. Hinges 42 operate with friction to allow lateral members 58 to pivot, and therefore, legs 38, 39, 40, 41 to be swung up and down. Protruding knob 48, as shown in FIG. 1, can be provided on lateral member 58 to help enable the legs to be easily grasped and extended in the upright position.

Figure 12:
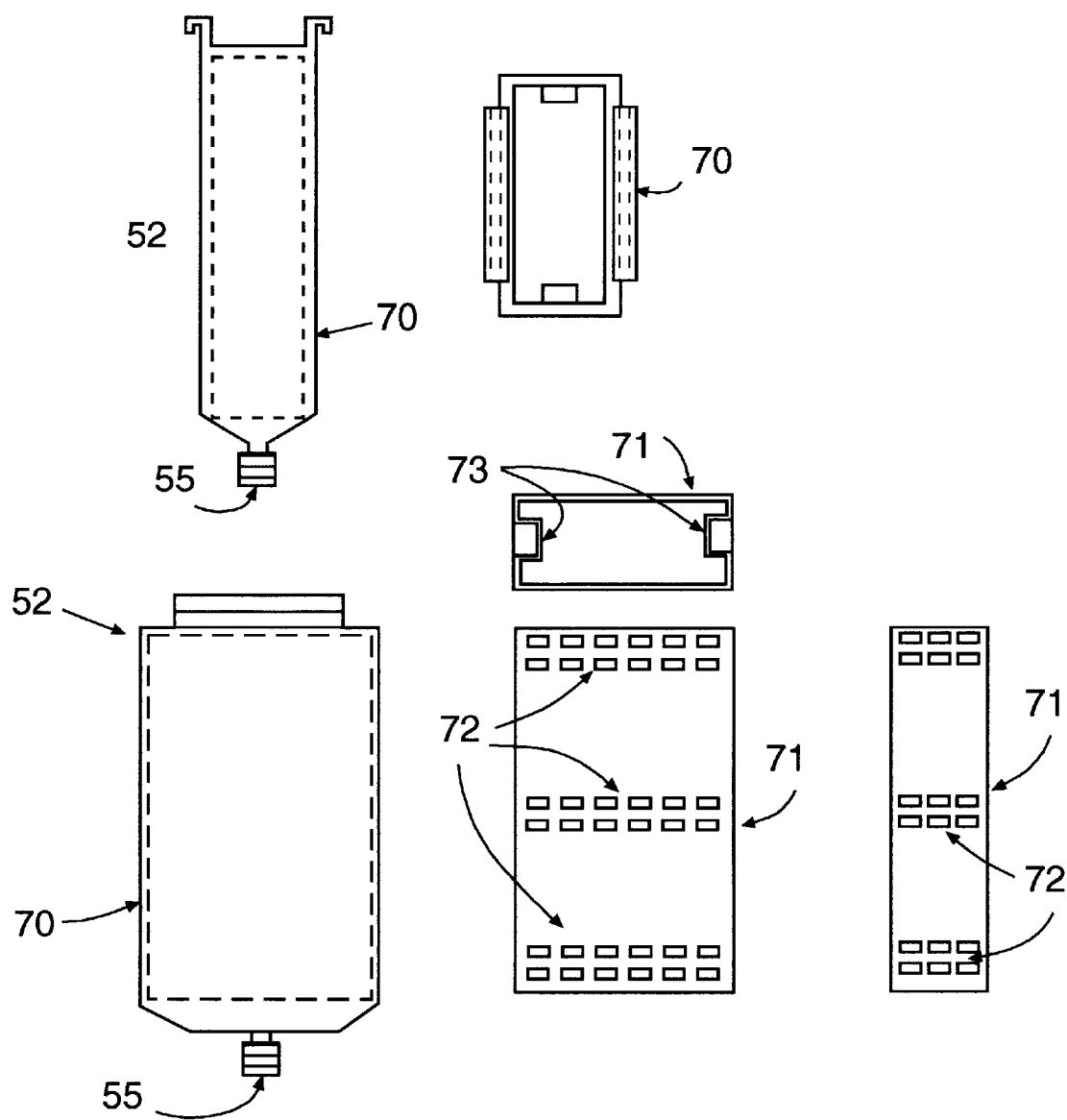
FIG. 12 shows a strainer funnel with outer housing.

Extending below floor 11 beneath drain 14 is a funnel hanging assembly 50, as shown in FIG. 11. Drain 14 extends through floor 11 and has an opening so that water and other debris can flow through and out from the bottom of the sink portion 2. Various funnel designs 51 and 52, as shown in FIGS. 11 and 12, can be supported by funnel assembly 50. Assembly 50 preferably comprises support runners on which funnels 51, 52, can slide. Funnel 51 has a lower opening 55 through which water can be drained. Opening 55 is preferably adapted to be connected to a hose, and can be used to divert water from sink 1 in a predetermined direction, i.e., so that water and debris do not pour out onto the user's feet. Funnel 51 can also be angled as shown to help divert water in a specific direction, i.e., such as backwards away from the user's feet.

A strainer 53 as well as a plug 54, shown in FIG. 11, can also be used in association with drain 14. Strainer 53 can be any conventional type that fits on top of drain 14 inside sink portion 2. Plug 54 can also be any conventional type, such as one that can fit above and below drain 14 to seal the opening therein. In this respect, the top piece of plug 54 is adapted to seal the drain opening 14 on floor 11, and the bottom piece is adapted to be held together with a bolt that can be tightened from beneath the sink portion 2. Plug 54 can be used to seal drain 14, such as when sink 1 is not in use, or when it is desirable to maintain water in sink portion 2. An additional smaller drain 57 can also be provided on sink portion 2, such as along side wall 16, as shown in FIG. 1. Drain 57 can be like any conventional drain with a plug, such as those used on ice chests.

Funnel 52, shown in FIG. 12, can also be used with a strainer 71 to capture debris and allow water to flow through opening 55 from drain 14 of sink portion 2. Funnel 52 and strainer 71 can be used to remove debris during cleanup tasks, such as removing fish and game parts, etc., while allowing water to drain out. Funnel 52 preferably has an outer funnel portion 70, which has means for hanging from funnel assembly 50, and an inner strainer 71, which can be supported by outer portion 70. Inner strainer 71 has a plurality of holes or perforations 72 through which water can pass, but which are small enough to catch debris. The inner strainer 71 preferably is sized so that it can be easily fitted into outer portion 70 from above, and preferably has handles 73 for easy insertion and removal.

Figure 13:
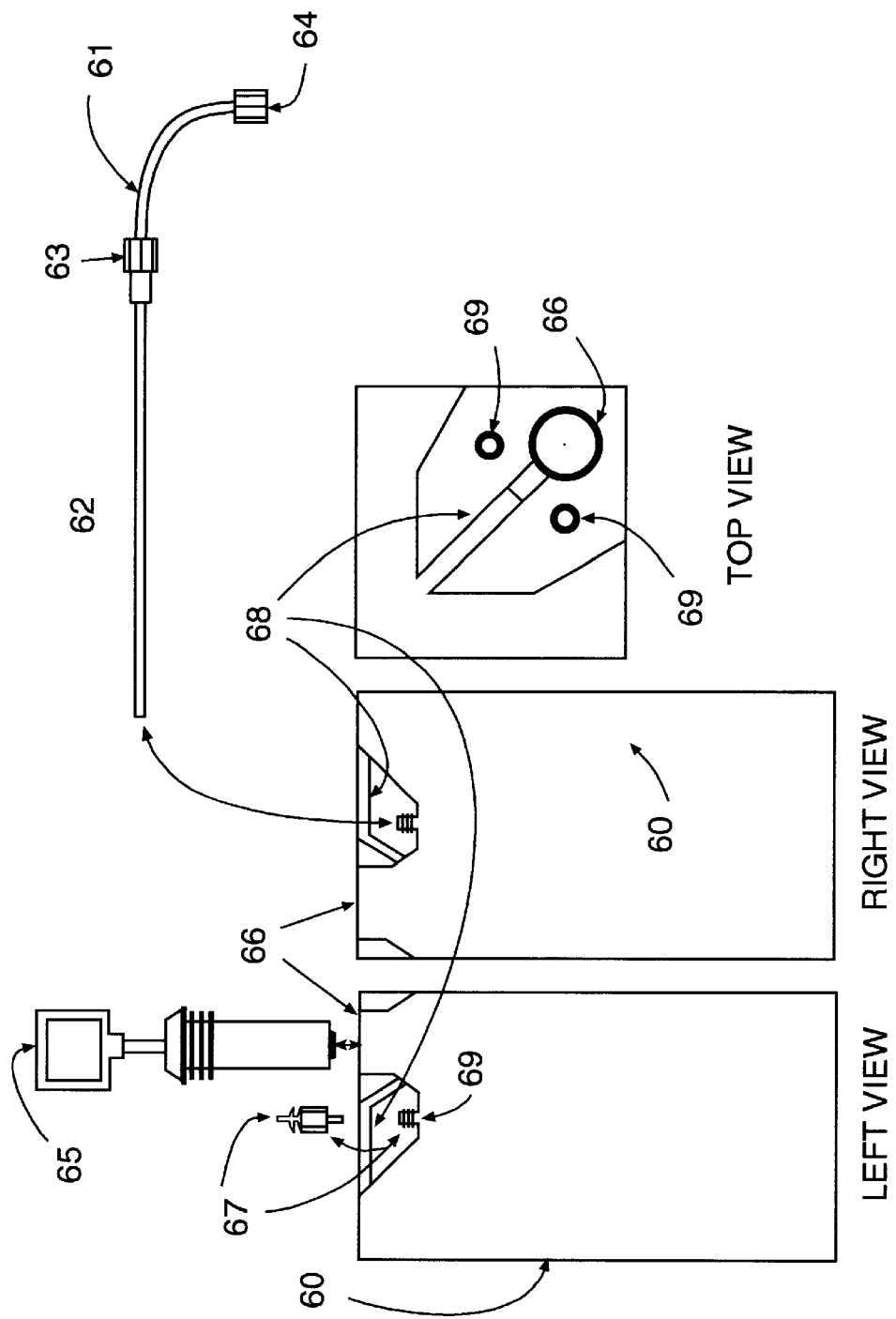
FIG. 13 shows a pressurized tank.

A portable water source, such as a pressurized tank 60, as shown in FIG. 13, can also be provided. Tank 60 can be sized and shaped so that it can be transported inside of sink portion 2, if desired, although preferably it is a standard tank. A water input spout 66 is preferably provided on the top, as well as two output openings 69. A hose 61 is preferably provided with a tube 62 (adapted to be fitted inside the tank) on one end, which has a threaded connector 63 adapted to be connected to one of the openings 69 on tank 60. On the other end of hose 61 is a second threaded connector 64 adapted to be connected to the hose connection 33 on sink portion 2 to supply water to sink 1. A hand operated pump 65, which is preferably adapted to be connected to input spout 66, can also be provided to add pressure into tank 60. A valve 67 can be provided on the other output opening 69 to release pressure when needed. A carrying handle 68 can also be provided for easy lifting.

The main components of the present invention are preferably made of materials similar to those used to construct ice boxes and ice chests, such as plastic, aluminum, metal, etc. In one embodiment of the present invention, sink portion 2 and lid 3 are made of materials that have insulation properties, such as those used in ice chests. In this way, sink 1 of the present invention can double as an ice chest. This can be useful on fishing and hunting trips, wherein fish and game parts are cleaned in sink 1, and then stored with ice inside sink portion 2, wherein lid 3 can be closed for easy transport home.

The other components of the present invention can be made of any conventional material. For example, the legs, handles, drawers, shelves, latches, funnels, etc. can be made of plastic, or other moldable material, or from the same materials used to make lid 3 and sink portion 2, etc. Any conventional materials can also be used to make items such as the connections, hoses, spigots, tanks, pumps, tubes, valves, liners, spray nozzles, meshes, baskets, cutting boards, cords, chains, plugs, hinges, nuts, handles, pins, latches, etc.

In use, the present invention can be set up on a table with legs 38, 39, 40, 41 tucked up, or on the ground and elevated with the legs extended, so that sink 1 can be raised to about the same height as a standard counter top. When extending legs 38, 39, 40, 41, tension between latch 45 and pin 44 helps maintain the legs in the upright position. Crossbars 46 can be slid down to help support legs 38, 39, 40, 41.

Latch 5 can be unhooked to open lid 3 to an upright position and limited by stop 7. Spigot 26 can be rotated up or down by loosening and tightening nut 28. Connection 33 can be used to connect sink 1 to an existing water supply such as a garden hose. In this respect, a separate hose can be carried in sink portion 2 so that it can be used to connect sink 1 to an outdoor water faucet when desired. Tank 60 can also be carried inside sink 1 and used where no existing water supply is available.

With sink 1 connected to a water supply, handle 31 can control valve 30 and be used to run water through spigot 26. Spray nozzle 29 can also be used to spray water through hose 27. Cutting boards 20 or basket 21 can be positioned on ledges 19 as discussed. Shelf 34 can be used to hold utensils, such as knives, forks, etc., as well as spray nozzle 29. Elastic mesh 35 can be used, such as during transport, for storing blankets, towels, etc. Drawer 9 is available to store items such as cutting boards 20, basket 21, utensils, etc. The cutting boards 20 are preferably sized so that they can be placed in drawer 9.

Funnels 51, 52, strainer 71, 53 and plug 54 can be used as needed. Funnels 51, 52 can be used with a second hose to divert water away from the user. Funnel 52 and strainer 71 can be used to strain debris from water flowing out of sink 2, while strainer 53 can be used in drain 14 to strain smaller particles. Plug 54 can be used to seal drain 14. Smaller drain and plug 57 can be used as an auxiliary means of draining water without removing plug 54.

When done, crossbars 46 can be raised and legs 38, 39, 40, 41 can be tucked up into the tucked position and held by friction with hinges 42. Spigot 26 can be moved back to a lower position. Spray nozzle 29 can be removed and stored in sink portion 2. The hose can be disconnected from connection 33 and placed inside the sink 1. All utensils, funnels, boards, baskets, etc., can be stored in sink 1 or drawer 9. Lid 3 can be closed with latch 5. Handles 6 can be used to carry sink 1.

The present invention has been described in terms of the preferred embodiments described above. While a preferred embodiment may have all of the features that have been described, the present invention contemplates that a portable sink having fewer than all of the features described above would still be within the scope of the present invention. In this respect, the present invention is intended to incorporate one or more of the features described above, as defined by the claims that follow.

What is claimed is:
1. A portable sink, comprising:
a body portion having walls and a floor;
a spigot extending from said body portion;
a plumbing connection adapted to be operatively connected to an existing water source, wherein said spigot is operatively connected to said plumbing connection and adapted to control the flow of water from said existing water source into said body portion;
a drain through which water in said body portion can flow out;
multiple legs for supporting said body portion in an upright position; and
wherein a hanging assembly is provided on the underside surface of said floor, and one or more removable funnel assemblies is provided which can be connected to said hanging assembly and extended below said drain.

2. The sink of claim 1, wherein said spigot is adjustable such that it can be moved between upper and lower positions.

3. The sink of claim 1, wherein a spray nozzle is operatively connected to said plumbing connection, said spray nozzle having a valve and control handle thereon.

4. The sink of claim 1, wherein the inside surface of said body portion has one or more ledge portions extending inwardly therefrom.

5. The sink of claim 4, wherein said ledge portions are adapted to support one or more auxiliary items selected from the group consisting of cutting boards and baskets.

6. The sink of claim 1, wherein a pivoting lid portion for covering said body portion is provided, said lid portion being capable of being moved from a closed position to an open position and vice verse, and wherein at least one shelf is provided on said lid portion extending along the inside portion thereof which can be extended substantially horizontally when said lid portion is in said open position, wherein said shelf has support means for supporting utensils thereon and said lid portion is provided with a stop connected to said body portion for limiting the opening movement of said lid portion.

7. The sink of claim 1, wherein a cavity is formed within said floor of said body portion, and a drawer is built into said cavity and has a handle thereon.

8. The sink of claim 1 wherein said legs can be moved between an upward tucked position and a lower extended position, and wherein four legs are provided, with one pair of legs on each side, wherein one pair of legs on one side is offset from the other pair of legs on the other side, such that all four legs can be tucked relatively tightly under said floor.

9. The sink of claim 8, wherein a crossbar is provided that extends between each pair of said legs, said crossbars being capable of sliding up and down along said legs, wherein said crossbars provide rigidity to said legs when said crossbars are lowered to a lower position.

10. The sink of claim 1, wherein said hanging assembly comprises a pair of runners, and said one or more funnel assemblies comprises a removable funnel having a pair of hangers extending therefrom which are adapted to be connected to said pair of runners extending from said hanging assembly, said funnel being adapted to have a hose attached thereto for directing water in a predetermined direction.

11. The sink of claim 1, wherein said one or more funnel assemblies comprises a funnel having a compartment for holding debris under said sink, and a strainer which can be inserted and supported inside said funnel for collecting and straining said debris under said sink.

12. The sink of claim 11, wherein said funnel has a pair of hangers extending therefrom which are adapted to be connected to a pair of runners extending from said hanging assembly, said funnel having a narrowed neck portion with an opening to allow water to drain out, and said strainer is adapted to fit inside said funnel from above.

13. The sink of claim 1, wherein a pressurized tank is provided which can be connected to said plumbing connection, said pressurized tank being capable of providing said sink with a supply of water, and wherein said tank is sized so that it can fit inside said body portion with said lid portion in said closed position.

14. A portable sink, comprising:

a sink portion having walls and a floor;

a lid portion for covering said sink portion, said lid portion being capable of being moved from a closed position to an open position and vice verse;

a plumbing connection adapted to be operatively connected to an existing water source;

a spigot operatively connected to said plumbing connection for controlling the flow of water from said existing water source into said sink portion through said plumbing connection;

a drain through which water in said sink portion can flow out; and wherein a hanging assembly is provided on the underside surface of said floor, said hanging assembly being adapted to support one or more removable funnel assemblies thereon extending under said drain, said one or more removable funnel assemblies has structure means for supporting a strainer inserted therein.

15. The sink of claim 14, wherein said spigot is adjustable such that it can be moved between an upper and lower position, wherein said spigot can be lowered to allow said lid portion to be moved to said closed position, and raised to allow water to flow into said body portion when said lid portion is in said open position.

16. The sink of claim 14, wherein a spray nozzle is operatively connected to said plumbing connection, said spray nozzle having a valve and control handle thereon.

17. The sink of claim 14, wherein the inside surface of said sink portion has ledges for supporting one or more cutting boards and baskets inside said sink portion.

18. The sink of claim 14, wherein a shelf is provided on said lid portion extending along the inside portion thereof which can be extended substantially horizontally when said lid portion is in said open position, said shelf having support means for supporting utensils thereon.

19. The sink of claim 14, wherein a cavity is formed within said floor of said sink portion, and a drawer is built into said cavity.

20. The sink of claim 14, wherein four legs that can be moved between an upward tucked position and a lower extended position are provided, with one pair of legs on each side, wherein one pair of legs on one side is offset from the other pair of legs on the other side, such that all four legs can be tucked relatively tightly under said floor, and wherein a crossbar is provided that extends between each pair of said legs, said crossbars being capable of sliding up and down along said legs, wherein said crossbars provide rigidity to said legs when said crossbars are lowered to a lower position.

21. The sink of claim 14, wherein a pressurized tank is provided which can be connected to said plumbing connection, said pressurized tank being capable of providing said sink with a supply of water.

22. The sink of claim 21, wherein said tank is sized so that it can fit inside said sink portion with said lid portion in said closed position.

23. The sink of claim 14, wherein said one or more removable funnel assemblies has a hose connected thereto for directing water flowing out of said drain in a predetermined direction.

\* \* \* \* \*